(12) United States Patent
Nakagawa et al.

(10) Patent No.: US 7,235,605 B2
(45) Date of Patent: Jun. 26, 2007

(54) CRYSTALLINE BIODEGRADABLE RESIN COMPOSITION

(75) Inventors: Hiroyuki Nakagawa, Aichi (JP); Haruyasu Mizutani, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 150 days.

(21) Appl. No.: 10/606,864

(22) Filed: Jun. 27, 2003

(65) Prior Publication Data

US 2004/0006200 A1  Jan. 8, 2004

(30) Foreign Application Priority Data

Jul. 2, 2002  (JP)  .................. P 2002-193760

(51) Int. Cl.
*C08L 67/02* (2006.01)

(52) U.S. Cl. .................. 525/166; 525/176; 525/165

(58) Field of Classification Search ................ 525/165, 525/166, 176, 177
See application file for complete search history.

(56) References Cited

U.S. PATENT DOCUMENTS

| | | | | |
|---|---|---|---|---|
| 5,252,642 A | * | 10/1993 | Sinclair et al. | 524/108 |
| 5,359,026 A | * | 10/1994 | Gruber | 528/354 |
| 5,714,573 A | * | 2/1998 | Randall et al. | 528/354 |
| 5,804,654 A | * | 9/1998 | Lo et al. | 525/67 |
| 6,114,495 A | * | 9/2000 | Kolstad et al. | 528/354 |
| 6,310,171 B1 | * | 10/2001 | Naito et al. | 528/49 |
| 6,833,397 B2 | * | 12/2004 | Miyamoto et al. | 523/344 |
| 6,969,745 B1 | * | 11/2005 | Taraiya et al. | 525/439 |
| 7,084,214 B2 | * | 8/2006 | Shiga et al. | 525/438 |
| 2002/0103273 A1 | * | 8/2002 | Inagaki et al. | 523/129 |

FOREIGN PATENT DOCUMENTS

| | | |
|---|---|---|
| JP | A-2000-290478 | 10/2000 |
| JP | A-2002-088161 | 3/2002 |
| JP | A-2002-105298 | 4/2002 |

OTHER PUBLICATIONS

English Translation of JP 2001-1511937, Jun. 2001, Hino et al.-Translation obtained from JPO Website.*
abstract JP 2003 192816 Jul. 9, 2003.*

* cited by examiner

*Primary Examiner*—Margaret G. Moore
(74) *Attorney, Agent, or Firm*—Posz Law Group, PLC

(57) ABSTRACT

A crystalline biodegradable resin composition obtained by annealing a composition comprising an aliphatic polyester and a modified elastomer.

2 Claims, No Drawings

CRYSTALLINE BIODEGRADABLE RESIN COMPOSITION

FIELD OF THE INVENTION

This invention relates to a crystalline biodegradable resin composition which meets both heat resistance and mechanical requirements.

BACKGROUND OF THE INVENTION

Biodegradable resin compositions that decompose in natural environments have recently been researched and developed from the standpoint of environmental conservation. Known crystalline biodegradable resin compositions, typically exemplified by polylactic acid, are poor in heat resistance and mechanical characteristics such as impact resistance.

SUMMARY OF THE INVENTION

Modification of the available biodegradable resin compositions by addition of polycaprolactone or inorganic fillers has been proposed in an attempt to improve heat resistance or mechanical strength such as impact resistance. However, biodegradable materials excellent in both heat resistance and impact resistance have not been developed as yet. Because heat resistance and impact resistance essentially conflict with each other, there has been no technique successful in satisfying both requirements.

An object of the present invention is to provide a crystalline biodegradable resin composition excellent in both heat resistance and mechanical characteristics.

The above object of the present invention is accomplished by a crystalline biodegradable resin composition obtained by annealing a composition comprising an aliphatic polyester and a modified elastomer. In the invention, an unmodified elastomer can be used in combination with the modified elastomer.

Comprising an aliphatic polyester and a modified elastomer, the biodegradable composition of the invention exhibits strong interfacial adhesion and high mechanical characteristics such as strength and impact resistance. Having been annealed, the composition is rendered crystalline to have improved heat resistance.

DETAILED DESCRIPTION OF THE INVENTION

The composition to be annealed is prepared by mixing an aliphatic polyester and a modified elastomer together with necessary additives, such as stabilizers, pigments, and nucleating agents, by use of a stirring machine, etc.

Annealing of the composition can be carried out in a drier or a vacuum drier. Vacuum drying is preferred in order to minimize the influences of water content, etc. Annealing may also be achieved by controlling the mold temperature in molding the resin composition. The annealing treatment brings about improvements on strength, impact resistance, and heat resistance.

The aliphatic polyester which can be used in the invention includes polylactic acid, polybutylene succinate, polyethylene succinate, polycaprolactone, and polyester carbonate. It is preferable to use polylactic acid, polybutylene succinate or a mixture thereof. Polylactic acid provides a crystalline biodegradable resin composition with a high elastic modulus. Polybutylene succinate provides a crystalline biodegradable resin composition excellent in impact resistance.

To accelerate crystallization thereby to enhance the improving effects on heat resistance and impact resistance, it is preferred to perform the annealing at a temperature not lower than the glass transition temperature (Tg) of the aliphatic polyester. At temperatures lower than the Tg, crystallization tends to be so slow as to fail to improve heat resistance and impact resistance. The annealing temperature is preferably lower than the melting point of the aliphatic polyester.

The annealing temperature is still preferably at least 15° C. higher than the Tg of the aliphatic polyester, i.e., (Tg+15° C.) or higher. At (Tg+15° C.) or higher temperatures, crystallization proceeds efficiently to secure high heat resistance and high impact resistance. At temperatures of Tg or higher and lower than (Tg+15° C.), crystallization proceeds, but the rate is not so high that much time would be needed for sufficient crystallization.

It is preferred for the modified elastomer to have a modifying group capable of interaction with a carbonyl group. In this case the modified elastomer exhibits improved compatibility with the aliphatic polyester, which is effective in improving impact resistance and strength. The term "interaction" as used for the modifying group includes action by van der Waals force and exchange of electrons, atoms or molecules through hydrogen bonding, covalent bonding, ion bonding, and the like.

The modifying group capable of interacting with a carbonyl group includes an unsaturated organic acid group, such as a maleic anhydride group, a phthalic anhydride group, an acrylic acid group, a maleic acid group or an itaconic acid group, an epoxy group, and a glycidyl group.

Modified elastomers having at least one of an epoxy group, an unsaturated organic acid group, and a glycidyl group as a modifying group are particularly preferred for improving impact resistance and strength.

The modified elastomer is preferably an ethylene elastomer. The modified elastomer is preferably one of a styrene elastomer, an acrylic elastomer, a silicone elastomer, a urethane elastomer, and a natural rubber elastomer. These preferred elastomers are particularly effective in improving impact resistance.

The ethylene elastomer includes ethylene-α-olefin elastomers, such as an ethylene-butadiene copolymer, an ethylene-propylene copolymer, and an ethylene-octene copolymer. The styrene elastomer includes a styrene-ethylene-butadiene-styrene copolymer and a styrene-butylene-styrene copolymer. The acrylic elastomer includes an epoxy-modified acrylic rubber and a glycidyl-modified acrylic rubber. The silicone elastomer includes an epoxy-modified silicone rubber. The urethane elastomer includes an epoxy-modified urethane rubber. The natural rubber elastomer includes epoxy-modified natural rubber.

The content of the modifying group in the modified elastomer is preferably 1 to 40% by weight, still preferably 1 to 30% by weight. With this modifying group content, the modified elastomer can form fine domains dispersed in the aliphatic polyester matrix to contribute to the improvement in impact resistance and strength. Where the modifying group content is less than 1% by weight, the resulting crystalline biodegradable composition tends to have insufficient strength. Where it is more than 40% by weight, the resulting composition tends to have insufficient impact resistance.

It is desirable for the crystalline biodegradable composition of the invention to have sea-island morphology so as to secure excellent mechanical characteristics such as strength and durability. For this the composition preferably comprises 100 parts by weight of the aliphatic polyester and 3 to 90 parts by weight (more preferably, 7 to 50 parts by weight) of the modified elastomer. With the modified elastomer content of less than 3 parts, the composition tends to have insufficient impact resistance. With more than 90 parts by weight of the modified elastomer, the composition tends to have insufficient heat resistance.

It is preferable for the composition to contain polytetrafluoroethylene. The aliphatic polyester will be highly crystallized starting from the added polytetrafluoroethylene, which will result in further improved heat resistance. In addition, the composition will have improved molding properties, and it will be easier to produce molded articles from the composition.

The polytetrafluoroethylene to be used is preferably acrylic-modified one. Acrylic-modified polytetrafluoroethylene is easy to finely disperse in the aliphatic polyester, which is advantageous for enhancing the effect of added polytetrafluoroethylene.

Where polytetrafluoroethylene is used, the composition preferably comprises 100 parts by weight of the aliphatic polyester, 3 to 90 parts by weight of the modified elastomer, and 0.1 to 50 parts by weight of polytetrafluoroethylene in order for the composition to have sea-island morphology and thereby exhibit excellent mechanical characteristics such as strength and durability as stated above. Where the modified elastomer content is out of this range, the same disadvantages as mentioned above can result. Where the content of polytetrafluoroethylene is less than 0.1 part by weight, the composition may tend to have insufficient heat resistance. If it exceeds 50 parts by weight, the resulting composition tends to have poor moldability.

EXAMPLES

The present invention will now be illustrated in greater detail with reference to Example, in which crystalline biodegradable resin compositions were prepared by annealing resin compositions comprising an aliphatic polyester and a modified elastomer and evaluated for performance as follows.

As shown in Tables 1 and 2, the aliphatic polyester was chosen from polylactic acid and polybutylene succinate, and the modified elastomer was chosen from epoxy-modified elastomers (styrene, acrylic, silicone, and natural rubber elastomers) and a maleic anhydride-modified ethylene elastomer. The modifying group content of the modified elastomers is shown in the Tables.

For example, sample A-1 is a crystalline biodegradable resin composition prepared by annealing a composition consisting of 100 parts by weight of polylactic acid and 10 parts by weight of epoxy-modified acrylic rubber as a modified acrylic elastomer having a modifying group content of 4% by weight. Formulations of samples A-2 through A-14 are shown in Table 1. Samples A-9 through A-14 were prepared by annealing the respective compositions which contained polytetrafluoroethylene (PTFE). Samples B-1 to B-4 are comparative biodegradable compositions which were prepared without annealing.

Samples A-1 to A-14 were prepared by mixing the components shown in Table 1 in a high-speed stirring machine for 3 minutes. Each of the resulting compositions was melt kneaded in a twin-screw extruder having a diameter of 30 mm at 220° C., extruded, and pelletized. The pellets were molded in a 80 t injection molding machine at a resin temperature of 220° C. to prepare a dumbbell specimen according to the ISO standard.

The dumbbell specimen was annealed under reduced pressure in a vacuum drier LHV-120 supplied by Tabai Espec Corp. at 80° C. (for samples except samples A-13 and A-14) or 120° C. (for samples A-13 and A-14) for 2 hours.

Comparative samples B-1 to B-4 were prepared from the components shown in Table 2 in the same manner as for samples A, except that the dumbbell specimen was not subjected to annealing.

The performance properties of the resin compositions were evaluated according to the following methods. The results obtained are shown in Tables 1 and 2.

1) Flexural Strength

Measured in accordance with ISO 178.

2) Izod Impact Strength

Measured at 23° C. in accordance with ISO 180.

3) Heat Distortion Temperature (HDT)

Measured under 0.46 MPa load in accordance with ISO 75.

4) Moldability

The moldability of the resin composition was evaluated by whether any trouble was observed (judged "bad") or not (judged "good") in melt-kneading and extruding from the twin-screw extruder and in injection molding into a dumbbell. Troubles that may happen in melt-kneading and extruding include output variation, strand breakage, and bridging in the hopper. Troubles that may happen in injection molding include molten resin leakage from the injection nozzle, extension of molding cycle time, and mold sticking.

As is apparent from Tables 1 and 2, samples A-1 to A-14 according to the present invention have high values in all of flexural strength, Izod impact strength and HDT, that is, they are superior in both mechanical characteristics and heat resistance. In contrast samples B-1 to B-4, which are non-annealed compositions, do not have high values in all of flexural strength, Izod impact strength and HDT, that is, do not satisfy both the mechanical strength and heat resistance requirements.

Comparison between sample A-3 and samples A-10, A-11 and A-12, those were the same as sample A-3 except for containing PTFE, reveals that addition of PTFE is effective to bring about improvement on flexural strength and marked improvement on heat resistance.

Comparison between samples A-12 and A-13 proves that elevation of the annealing temperature from 80° C. to 120° C. results in improvement in flexural strength, Izod impact strength, and HDT, i.e., mechanical strength and heat resistance. Both samples exhibited satisfactory moldability.

Because polybutylene succinate and polylactic acid are generally different in strength and heat resistance, sample A-9 has lower flexural strength than other annealed samples. Nevertheless it is superior to sample B-2 having the same composition in flexural strength, impact resistance, and heat resistance, clearly demonstrating the effect of the annealing treatment of the invention.

TABLE 1

| | A-1 | A-2 | A-3 | A-4 | A-5 | A-6 | A-7 | A-8 | A-9 | A-10 | A-11 | A-12 | A-13 | A-14 |
|---|---|---|---|---|---|---|---|---|---|---|---|---|---|---|
| Polylactic acid*[1] | 100 | 100 | 100 | 100 | 100 | 100 | 100 | 100 | | 100 | 100 | 100 | 100 | 100 |
| Polybutylene succinate*[2] | | | | | | | | | 100 | | | | | |
| Epoxy-modified elastomer Styrene*[3] | | | | 15 | | | | | | | | | | |
| Acrylic | 10 | 80 | 15 | | | | | | 15 | 15 | 15 | 15 | 15 | 7 |
| Silicone*[4] | | | | | 15 | | | | | | | | | |
| Urethane | | | | | | 15 | | | | | | | | |
| Natural rubber*[5] | | | | | | | 15 | | | | | | | |
| Maleic anhydride-modified ethylene elastomer*[6] | | | | | | | | 15 | | | | | | |
| Unmodified styrene elastomer*[7] | | | | | | | | | | | | | | 7 |
| PTFE | | | | | | | | | 1 | 0.5 | 40 | 1.0 | 1.0 | 1.0 |
| Modifying group content of elastomer (wt %) | 4 | 15 | 4 | 4 | 4 | 4 | 20 | 4 | 4 | 4 | 4 | 4 | 4 | 4 |
| Annealing temp. (° C.) | 80 | 80 | 80 | 80 | 80 | 80 | 80 | 80 | 80 | 80 | 80 | 80 | 120 | 120 |
| Flexural strength (MPa) | 85 | 63 | 75 | 72 | 63 | 72 | 62 | 75 | 42 | 85 | 75 | 85 | 88 | 85 |
| Izod impact strength at 23° C. (kJ/m$^2$) | 17 | 40 | 37 | 62 | 30 | 60 | 20 | 18 | 18 | 30 | 40 | 31 | 34 | 28 |
| HDT under 0.46 MPa (° C.) | 100 | 70 | 80 | 80 | 72 | 80 | 90 | 80 | 97 | 130 | 105 | 132 | 139 | 130 |
| Moldability | good | good | good | good | good | good | good | good | good | good | good | good | good | good |

Note:
*[1]Mol. wt.: 15.3 × 10$^4$; Tg: 62° C.
*[2]Mol. wt.: 14.2 × 10$^4$; Tg: −32° C.
*[3]AR-P1100 available from Aronkasei Co., Ltd.
*[4]L-9300 available from Nippon Unicar Co., Ltd.
*[5]ENR50
*[6]MA8510 available from Mitsui Chemicals, Inc.
*[7]G1652 available from Kraton JSR Elastomers K.K.

TABLE 2

| | B-1 | B-2 | B-3 | B-4 |
|---|---|---|---|---|
| Polylactic acid*[1] | 100 | | 100 | 100 |
| Polybutylene succinate*[2] | | 100 | | |
| Epoxy-modified elastomer Styrene*[3] | | | | |
| Acrylic | 15 | 15 | | 15 |
| Silicone*[4] | | | | |
| Urethane | | | | |
| Natural rubber*[5] | | | | |
| PTFE | | | 1 | 0.5 | 1 |
| Modifying group content of elastomer (wt %) | 4 | 4 | — | 4 |
| Flexural strength (MPa) | 65 | 38 | 110 | 75 |
| Izod impact strength at 23° C. (kJ/m$^2$) | 12 | 13 | 2 | 10 |
| HDT under 0.46 MPa (° C.) | 53 | 95 | 53 | 53 |
| Moldability | good | good | good | good |

Note:
*[1], *[2], *[3], *[4], and *[5] are the same as in Table 1.

This application is based on Japanese Patent application JP 2002-193760, filed Jul. 2, 2002, the entire content of which is hereby incorporated by reference, the same as if set forth at length.

What is claimed is:

1. An annealed, heat-resistant molded article comprising a crystalline biodegradable resin composition obtained by annealing a molded composition consisting of:

100 parts by weight of an aliphatic polyester including at least one of polylactic acid and polybutylene succinate;

3 to 90 parts by weight of an epoxy-modified acrylic elastomer including a modifying group in an amount of 1 to 40% by weight, the modifying group being an epoxy group; and 0.1 to 50 parts by weight of polytetrafluoroethylene, the polytetrafluoroethylene being acrylic-modified, wherein the annealing is carried out at a temperature higher than a glass transition temperature of the aliphatic polyester by at least 15° C.

2. The molded article according to claim 1 wherein the composition comprises 7 to 50 parts by weight of the epoxy-modified acrylic elastomer.

* * * * *